(12) United States Patent
Kim et al.

(10) Patent No.: US 11,197,309 B2
(45) Date of Patent: Dec. 7, 2021

(54) METHOD AND APPARATUS FOR FRAME STRUCTURE CONFIGURATION AND INFORMATION TRANSMISSION FOR SHORT TTI

(71) Applicant: KT CORPORATION, Gyeonggi-do (KR)

(72) Inventors: Ki-tae Kim, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/084,594

(22) PCT Filed: Mar. 8, 2017

(86) PCT No.: PCT/KR2017/002535
§ 371 (c)(1),
(2) Date: Sep. 13, 2018

(87) PCT Pub. No.: WO2017/160020
PCT Pub. Date: Sep. 21, 2017

(65) Prior Publication Data
US 2019/0104533 A1    Apr. 4, 2019

(30) Foreign Application Priority Data

Mar. 14, 2016  (KR) .......................... 10-2016-0030172
Feb. 21, 2017  (KR) .......................... 10-2017-0022956

(51) Int. Cl.
*H04W 72/12*    (2009.01)
*H04W 72/04*    (2009.01)
(Continued)

(52) U.S. Cl.
CPC ........... *H04W 72/1268* (2013.01); *H04L 5/00* (2013.01); *H04W 72/048* (2013.01);
(Continued)

(58) Field of Classification Search
CPC .. H04L 27/2602; H04L 5/00; H04W 72/0446; H04W 24/10; H04W 72/042;
(Continued)

(56) References Cited

U.S. PATENT DOCUMENTS 10,051,658 B2 *  8/2018  Kim .................. H04W 74/0866
10,200,137 B2 *  2/2019  Au ......................... H04J 3/1694
(Continued)

OTHER PUBLICATIONS

Huawei et al., "Overview of short TTI", R1-160291, 3GPP TSG RAN WG1 Meeting #84, St Julian's, Malta, Feb. 15-19, 2016.
(Continued)

*Primary Examiner* — Melanie Jagannathan
(74) *Attorney, Agent, or Firm* — Invenstone Patent, LLC

(57) ABSTRACT

Provided are a method for configuring a short-TTI frame structure in a 3GPP LTE/LTE-advanced system, a method for transmitting, to a terminal, information on the configured short-TTI frame structure, and a method for receiving short-TTI frame structure configuration information by a terminal. The method may include: receiving, by the terminal, configuration information of a short-TTI configured to have a predetermined number of symbols; and receiving data through a frame structure including the short-TTI configured to have the predetermined number of symbols on the basis of the configuration information of the short-TTI.

6 Claims, 11 Drawing Sheets

(51) Int. Cl.
*H04L 5/00* (2006.01)
*H04W 80/08* (2009.01)

(52) U.S. Cl.
CPC ... *H04W 72/0446* (2013.01); *H04W 72/1289* (2013.01); *H04W 80/08* (2013.01)

(58) Field of Classification Search
CPC ........... H04W 72/1278; H04W 72/048; H04W 72/1268; H04W 72/1289; H04W 80/08
See application file for complete search history.

(56) References Cited

U.S. PATENT DOCUMENTS

| | | | |
|---|---|---|---|
| 2009/0175245 A1 | 7/2009 | Harada et al. | |
| 2014/0071954 A1 | 3/2014 | Au et al. | |
| 2015/0351093 A1 | 12/2015 | Au et al. | |
| 2016/0219582 A1* | 7/2016 | Tiirola | H04L 27/2602 |
| 2017/0265169 A1* | 9/2017 | Chen | H04W 24/10 |
| 2018/0098337 A1* | 4/2018 | Lee | H04W 72/1278 |
| 2018/0242347 A1* | 8/2018 | Sahlin | H04W 72/0446 |
| 2018/0279330 A1* | 9/2018 | Hong | H04J 11/0023 |
| 2018/0343682 A1* | 11/2018 | Tang | H04L 1/0006 |
| 2018/0359068 A1* | 12/2018 | Kim | H04W 72/14 |
| 2019/0052483 A1* | 2/2019 | Akula | H04W 72/1268 |
| 2019/0190763 A1* | 6/2019 | Takeda | H04W 28/06 |
| 2019/0223209 A1* | 7/2019 | Li | H04W 72/1289 |
| 2019/0379515 A1* | 12/2019 | Gao | H04W 72/042 |
| 2020/0037349 A1* | 1/2020 | Gao | H04L 5/001 |
| 2020/0374935 A1* | 11/2020 | Bergstrom | H04W 72/0446 |

OTHER PUBLICATIONS

LG Electronics, "Study on TTI shortening for uplink transmissions", R1-160653, 3GPP TSG RAN WG1 Meeting #84, St Julian's, Malta, Feb. 15-19, 2016.

Samsung, "Study on latency reduction due to TTI shortening", R1-160584, 3GPP TSG RAN WG1 Meeting #84, St Julian's, Malta, Feb. 15-19, 2016.

Samsung, "Specification impact for DL due to TTI shortening", R1-160585, 3GPP TSG RAN WG1 Meeting #84, St Julian's, Malta, Feb. 15-19, 2016, pp. 1-4.

NTT Docomo, Inc., "DL aspects of TTI shortening", R1-160964, 3GPP TSG RAN WG1 Meeting #84, St Julian's, Malta, Feb. 15-19, 2016, pp. 1-7.

* cited by examiner

METHOD AND APPARATUS FOR FRAME STRUCTURE CONFIGURATION AND INFORMATION TRANSMISSION FOR SHORT TTI

CROSS REFERENCE TO RELATED APPLICATIONS

This application is a National Stage Patent Application of PCT International Patent Application No. PCT/KR2017/002535 (filed on Mar. 8, 2017) under 35 U.S.C. § 371, which claims priority to Korean Patent Application Nos. 10-2016-0030172 (filed on Mar. 14, 2016), and 10-2017-0022956 (filed on Feb. 21, 2017), the teachings of which are incorporated herein in their entireties by reference.

TECHNICAL FIELD

The present embodiments relate to a method of configuring a short transmission time interval (TTI) frame structure and transmitting information regarding the configuration in a 3GPP LTE/LTE-Advanced system.

BACKGROUND ART

Recently, research has been conducted and discussions have been held on latency reduction in $3^{rd}$ generation partnership project (3GPP) long term evolution (LTE)/LTE-Advanced systems. The main purpose of latency reduction is to standardize the operation of a short transmission time interval (hereinafter referred to as "short TTI" or "sTTI") in order to improve TCP throughput.

To this end, in the radio access network (RAN)2, performance verification is being performed on short TTI. Also discussion is underway on the feasibility and performance of TTI lengths between 0.5 ms and one OFDM symbol, maintenance of backwards compatibility, and the like.

Although studies on the physical layer for such a short TTI are in process, a detailed frame structure for short TTI has not been established yet. Thus there is no specific short TTI operating plan.

DETAILED DESCRIPTION OF THE INVENTION

Technical Problem

In accordance with embodiments, a method of a base station may be provided for configuring a short TTI-based frame structure, and a specific method of a base station may be provided for delivering information regarding the configured short TTI frame structure to a user equipment.

Technical Solution

In an aspect, a method of a terminal may be provided for receiving short-TTI frame structure configuration information. The method may include receiving configuration information of a short TTI configured to have a predetermined number of symbols; and receiving data through a frame structure including the short TTI configured to have the predetermined number of symbols on the basis of the configuration information of the short TTI.

In another aspect, a method of a base station may be provided for transmitting short TTI frame structure configuration information, the method including: configuring a short TTI to have a predetermined number of symbols; transmitting configuration information of the configured short TTI to a user equipment (UE); and transmitting data through a frame structure including the short TTI configured to have the predetermined number of symbols.

In another aspect, a user equipment (UE) may be provided for receiving short TTI frame structure configuration information. The UE may include a receiver configured to receive configuration information of a short TTI configured to have a predetermined number of symbols; and a controller configured to control the receiver to receive data through a frame structure including the short TTI configured to have the predetermined number of symbols on the basis of the configuration information of the short TTI.

In another aspect, a base station may be provided for transmitting F short TTI frame structure configuration information. The base station may include a controller configured to configure a short TTI to have a predetermined number of symbols; and a transmitter configured to transmit configuration information of the configured short TTI to a user equipment (UE), wherein the controller controls the transmitter to transmit data through a frame structure including the short TTI configured to have the predetermined number of symbols.

Advantageous Effects of the Invention

According to the present embodiments, it is possible to provide a method of configuring a short TTI-based frame structure and a specific method of delivering information regarding the configured short TTI frame structure. The principles of these methods may be applied not only to a new frame structure but also to similar signals and channels.

MODE FOR CARRYING OUT THE INVENTION

Figure 1:
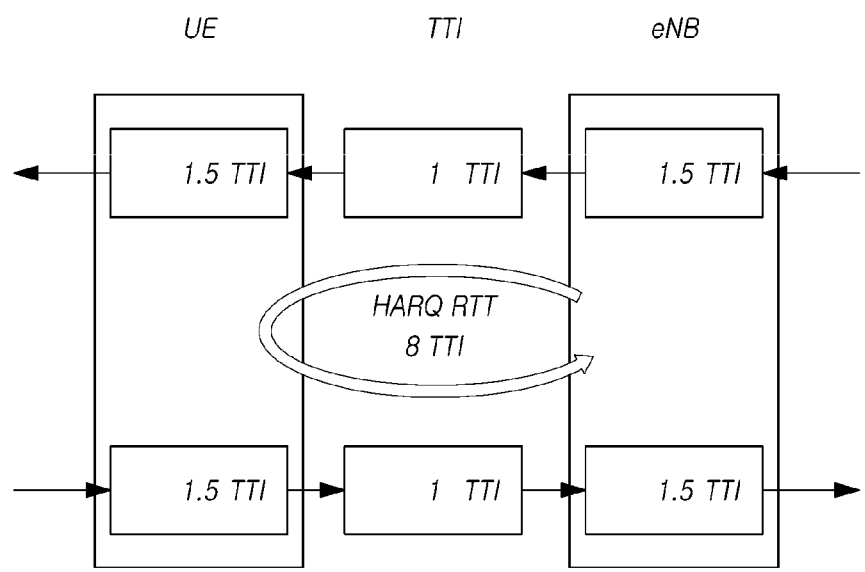
FIG. 1 is a diagram for explaining eNB and UE processing delays and HARQ RTT.

Hereinafter, some embodiments of the present disclosure will be described in detail with reference to the accompanying drawings. When assigning a reference number to each component shown in the drawings, it should be noted that the same components are given the same reference numbers even though they are shown in different drawings. Further, in the following description of the present disclosure, a detailed description of known functions and configurations incorporated herein will be omitted when it is determined that the description may make the subject matter of the present disclosure unclear.

In this specification, a machine type communication (MTC) terminal may refer to a terminal that supports low cost (or low complexity), a terminal that supports coverage enhancement, or the like. In this specification, the MTC terminal may refer to a terminal that supports low cost (or low complexity) and coverage enhancement or the like. Alternatively, in this specification, the MTC terminal may refer to a terminal that is defined in a predetermined category for supporting low cost (or low complexity) and/or coverage enhancement.

In other words, in this specification, the MTC terminal may refer to a newly defined third generation partnership project (3GPP) Release 13 low cost (or low complexity) UE category/type, which executes LTE-based MTC-related operations. Alternatively, in this specification, the MTC terminal may refer to a UE category/type that is defined in or before 3GPP Release-12 that supports the enhanced coverage in comparison with the typical LTE coverage or supports low power consumption or may refer to a newly defined Release 13 low cost (or low complexity) UE category/type.

A wireless communication system according to the present disclosure may be extensively installed to provide various communication services, such as a voice data service, a packet data service, and the like. The wireless communication system may include a user equipment (UE) and a base station (BS) (or an evolved node B (eNB)). Throughout the specification, the UE may be an inclusive concept indicating a terminal utilized in wireless communication, including a mobile station (MS), a user terminal (UT), a subscriber station (SS), a wireless device, and the like in global systems for mobile communication (GSM) as well as the UE in wideband code division multiple access (WCDMA), long term evolution (LTE), high speed packet access (HSPA), and the like.

The BS or a cell may generally refer to a station that communicates with the UE, and the term "BS" may be interchangeably used with the terms "Node-B," "evolved Node-B (eNB)," "sector," "site," "base transceiver system (BTS)," "access point," "relay node," "remote radio head (RRH)," "radio unit (RU)," "small cell," and the like.

That is, in this specification, the BS or the cell may be construed as an inclusive concept indicating some areas or functions covered by a base station controller (BSC) in code division multiple access (CDMA), a NodeB in WCDMA, an eNB or a sector (site) in LTE, and the like, and the concept may include any of various coverage areas such as a megacell, a macrocell, a microcell, a picocell, a femtocell, communication ranges of a relay node, an RRH, an RU, and a small cell.

Since each of the above-described various cells has a BS for controlling each cell, the BS may be construed in the following two ways: (1) the BS may be an apparatus that provides a megacell, a macrocell, a microcell, a picocell, a femtocell, and a small cell in association with a wireless area; or (2) the BS may indicate the wireless area itself. In (1), any apparatus that provides a predetermined wireless area and that is controlled by the same entity or any apparatus that interacts with another to cooperatively configure a wireless area may be referred to as the BS. Based on the configuration type of the wireless area, an eNB, an RRH, an antenna, an RU, a low power node (LPN), a point, a transmission/reception point, a transmission point, a reception point, and the like may be examples of the BS. In (2), the wireless area itself where signals are received or transmitted from the perspective of the UE or a neighboring BS may be referred to as the BS.

Therefore, the megacell, the macrocell, the microcell, the picocell, the femtocell, the small cell, the RRH, the antenna, the RU, the LPN, the point, the eNB, the transmission/reception point, the transmission point, and the reception point are collectively referred to as the BS.

In this specification, the UE and the BS are used as two inclusive transceiving subjects to embody the technology and technical concepts described in this specification and may not be limited to predetermined terms or words. In this specification, the UE and the BS are used as two (uplink or downlink) inclusive transceiving subjects to embody the technology and technical concepts described in this specification. However, the UE and the BS may not be limited to predetermined terms or words. Here, uplink (UL) refers to a scheme in which the UE transmits and receives data to and from, respectively, the BS, and downlink (DL) refers to a scheme in which the BS transmits and receives data to and from, respectively, the UE.

There are no restrictions on multiple access schemes applied to wireless communication systems. Multiple access schemes such as CDMA, time division multiple access (TDMA), frequency division multiple access (FDMA), orthogonal frequency division multiple access (OFDMA), OFDM-FDMA, OFDM-TDMA, OFDM-CDMA, and the like may be used. An embodiment of the present invention may be applicable to resource allocation in an asynchronous wireless communication scheme that evolves to LTE and LTE-advanced via GSM, WCDMA, and HSPA and in a synchronous wireless communication scheme that evolves to CDMA, CDMA-2000, and ultra mobile broadband (UMB). Embodiments of the present disclosure should not be construed as being restricted or limited to a specific wireless communication field and should be construed as including all technical fields to which the technical spirit of the present disclosure is applicable.

UL transmission and DL transmission may be performed based on i) a time division duplex (TDD) scheme in which the transmission is performed by means of different times may be used or ii) a frequency division duplex (FDD) scheme in which the transmission is performed by means of different frequencies.

Further, in a system such as LTE and LTE-A, a specification is formed by configuring the UL and the DL based on a single carrier or a pair of carriers. The UL and the DL may carry control information through a control channel such as physical downlink control channel (PDCCH), physical control format indicator channel (PCFICH), physical hybrid ARQ indicator channel (PITCH), physical uplink control channel (PUCCH), enhanced physical downlink control channel (EPDCCH), and the like. The UL and the DL may carry data through a data channel such as physical downlink shared channel (PDSCH), physical uplink shared channel (PUSCH), and the like.

Meanwhile, the UL and the DL may carry control information even by using enhanced PDCCH or extended PDCCH (EPDCCH).

In this specification, the cell may refer to the coverage of a signal transmitted from the transmission/reception point (or the transmission point), a component carrier having the coverage of the signal transmitted from the transmission/reception point, or the transmission/reception point itself.

A wireless communication system according to embodiments may refer to a coordinated multi-point transmission/reception (CoMP) system where two or more transmission/reception points cooperatively transmit the signal, a coordinated multi-antenna transmission system, or a coordinated multi-cell communication system. The CoMP system may include at least two multi-transmission/reception points and terminals.

Each of the multi-transmission/reception points may be the BS or the macrocell (hereinafter, referred to as an eNB) and at least one RRH that has high transmission power or low transmission power within a macrocell area and that is connected to the eNB through an optical cable or an optical fiber and controlled in a wired manner.

Hereinafter, the DL refers to communication or a communication path from a multi-transmission/reception point to a terminal, and the UL refers to communication or a communication path from a terminal to a multi-transmission/reception point. In the DL, a transmitter may be a part of the multi-transmission/reception point, and a receiver may be a part of the terminal. In the UL, a transmitter may be a part of the terminal, and a receiver may be a part of the multi-transmission/reception point.

Hereinafter, data transmission and reception through a channel such as PUCCH, PUSCH, PDCCH, EPDCCH, and PDSCH may be described through the expression "PUCCH, PUSCH, PDCCH, EPDCCH, and PDSCH are transmitted or received."

In addition, hereinafter, the expression "PDCCH is transmitted or received" or "the signal is transmitted or received through PDCCH" includes the same meaning that "EPDCCH is transmitted or received" or "the signal is transmitted or received through EPDCCH."

That is, a physical downlink control channel used herein may indicate PDCCH or EPDCCH and may indicate both of the PDCCH and the EPDCCH.

Also, for convenience of description, according to an embodiment of the present disclosure, EPDCCH may be applied to a part described using PDCCH, and PDCCH may be applied to a part described using EPDCCH.

Meanwhile, higher layer signaling, which will be described below, includes radio resource control (RRC) signaling that carries RRC information including RRC parameters.

The eNB performs DL transmission to terminals. The eNB may transmit PDSCH, which is a primary physical channel for unicast transmission, and may transmit PDCCH for carrying DL control information such as scheduling required for reception of the PDSCH and scheduling approval information for transmission of the UL data channel (e.g., PUSCH). Hereinafter, transmission and reception of a signal through each channel will be described as transmission and reception of a corresponding channel.

[Latency Reduction in RAN1]

Latency reduction study Item has been approved in RAN plenary #69 meeting. The main purpose of latency reduction is to standardize shorter TTI operations in order to improve TCP throughput. For this purpose, RAN2 has already performed performance verification on short TTI.

Within the following range, study is performed along with potential impacts associated with RAN1.

Assess specification impact and study feasibility and performance of TTI lengths between 0.5 ms and one OFDM symbol, taking into account impact on reference signals and physical layer control signaling backwards compatibility shall be preserved (thus allowing normal operation of pre-Rel 13 UEs on the same carrier);

Latency reduction can be achieved by the following physical layer techniques:

short TTI reduced processing time in implementation new frame structure of TDD

Additional agreements at the 3GPP RAN WG1 #84 meeting are as follows.

Agreements:
Following design assumptions are considered:
No shortened TTI spans over subframe boundary
At least for SIBs and paging, PDCCH and legacy PDSCH are used for scheduling
The potential specific impacts for the followings are studied
UE is expected to receive a sPDSCH at least for DL unicast
sPDSCH refers PDSCH carrying data in a short TTI
UE is expected to receive PDSCH for DL unicast
FFS whether a UE is expected to receive both sPDSCH and PDSCH for DL unicast simultaneously
FFS: The number of supported short TTIs
If the number of supported short TTIs is more than one,
Agreements:
Following design assumptions are used for the study
From an eNB perspective, existing non-sTTI and sTTI can be FDMed in the same subframe in the same carrier
FFS: Other multiplexing method(s) with existing non-sTTI for UE supporting latency reduction features
Agreements:
In this study, following aspects are assumed in RAN1.
PSS/SSS, PBCH, PCFICH and PRACH, Random access, SIB and Paging procedures are not modified.
Following aspects are further studied in the next RAN1 meeting
Note: But the study is not limited to them.
Design of sPUSCH DM-RS
Alt. 1: DM-RS symbol shared by multiple short-TTIs within the same subframe
Alt. 2: DM-RS contained in each sPUSCH
HARQ for sPUSCH
Whether/how to realize asynchronous and/or synchronous HARQ
sTTI operation for Pcell and/or SCells by (e)CA in addition to non-(e)CA case Basically, latency will be calculated in average down-link latency calculation according to the following procedure.

FIG. 1 is a diagram for explaining eNB and UE processing delays and HARQ RTT.

Following the same approach as in section B.2.1 in 3GPP TR 36.912, the LTE U-plane one-way latency for a scheduled UE consists of the fixed node processing delays and 1 TTI duration for transmission, as shown in FIG. 1. Assuming the processing times can be scaled by the same factor of TTI reduction keeping the same number of HARQ processes, the one way latency can be calculated as $D=1.5$ TTI (eNB processing and scheduling)+1 TTI (transmission)+1.5 TTI (*UE processing*)+$n*8$ TTI (HARQ retransmissions)=$(4+n*8)$ TTI.

Considering a typical case where there would be 0 or 1 retransmission, and assuming error probability of the first transmission to be p, the delay is given by $D=(4+p*8)$ TTI.

So, for 0% BLER, D=4*TTI,

And for 10% BLER, D=4.8*TTI.

Average UE initiated UL transmission latency calculation

Assume UE is in connected/synchronized mode and wants to do UL transmission, e.g., to send TCP ACK. Following table 1 (UL transmission latency calculation) shows the steps and their corresponding contribution to the UL transmission latency. To be consistent in comparison of DL and UL, we add the eNB processing delay in the UL after the UL data is received by the eNB (step 7).

TABLE 1

| Step | Description | Delay |
|------|-------------|-------|
| 1. | Average delay to next SR opportunity | SR periodicity/2 |
| 2. | UE sends SR | 1 TTI |
| 3. | eNB decodes SR and generates scheduling grant | 3 TTI |
| 4. | Transmission of scheduling grant (assumed always error free) | 1 TTI |
| 5. | UE processing delay (decoding Scheduling grant + L1 encoding of data) | 3 TTI |
| 6. | UE sends UL transmission | (1 + p*8) TTI where p is initial BLER. |
| 7. | eNB receives and decodes the UL data | 1.5 TTI |

In the table 1 above, steps 1-4 and half delay of step 5 is assumed to be due to SR, and rest is assumed for UL data transmission in values shown in Table 4

Resource Mapping of Short TTI [3]

Figure 2:
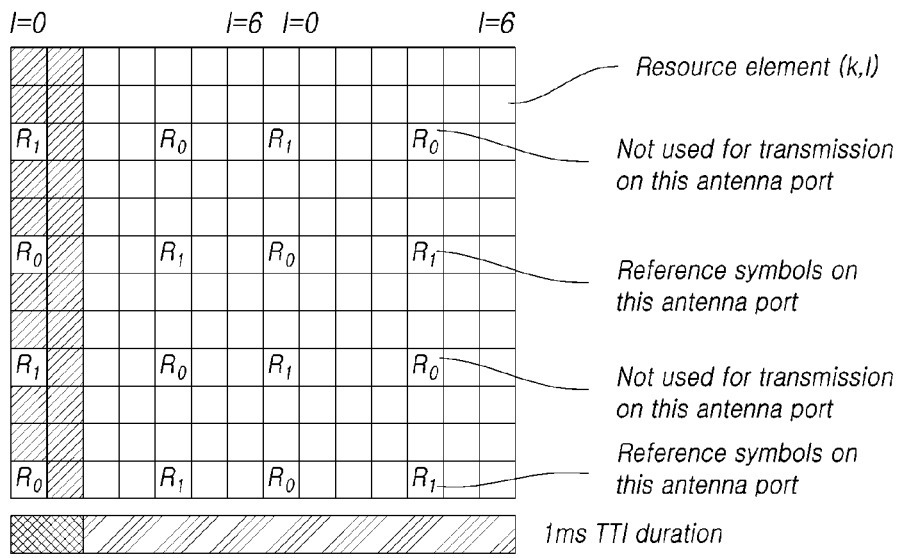
FIG. 2 is a diagram for explaining resource mapping per PRB in one subframe.
Figure 2:
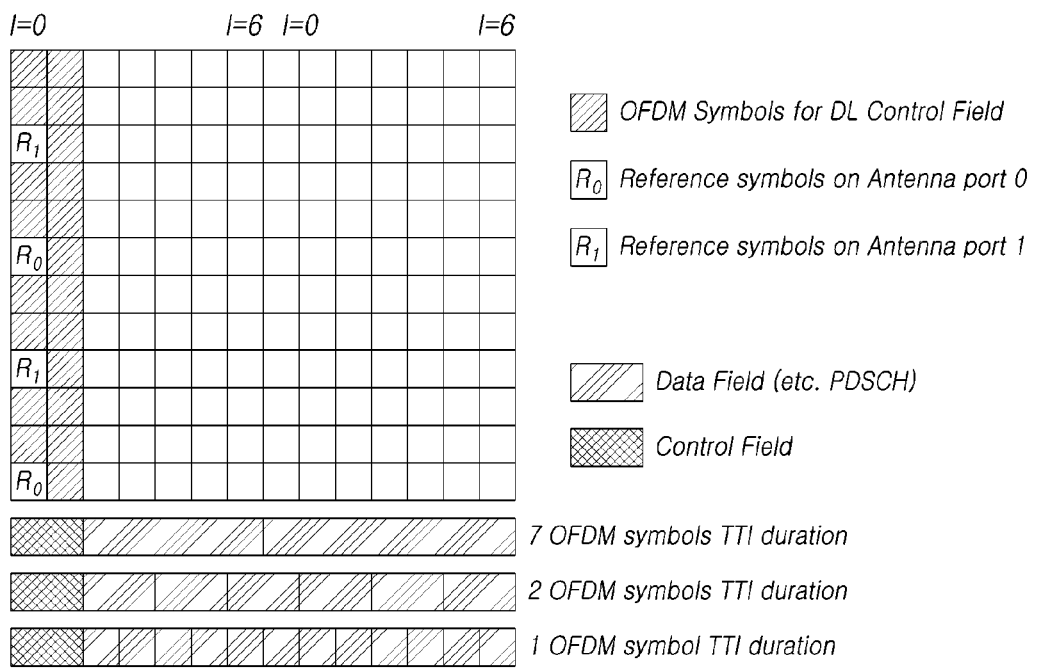

FIG. 2 is a diagram for describing resource mapping per PRB in one subframe.

In FIG. 2, the resource map above is the legacy resource mapping per PRB in one subframe, considering 2 Antenna ports and 2 OFDM symbols control field. In FIG. 2 the resource map below is the short TTI resource mapping, considering 2 OFDM symbols used for the control field in order to ensure the backward compatibility. The loss rates ($L_{legacy}$, e.g. 5%-50%) of the PHY layer in short TTI duration are assumed.

TBS Calculation of Short TTI

According to the resource mapping and the TBS calculation formula given above, the loss rate of PHY layer for legacy PDSCH is calculated as follows:

$$L_{legacy} = \frac{\text{the number of reference symbols within } PDSCH}{\text{the number of } REs \text{ within } PDSCH} = \frac{12}{144} = 8.3\%$$

For different short TTI duration, The TBS of short TTI PDSCH is calculated as the following table 2 (TBS calculation for different TTI duration):

TABLE 2

| TTI Duration | TBS of short TTI PDSCH ($TBS_{short}$) |
|---|---|
| 7 OFDM symbol | First time slot: $TBS_{short} = TBS_{legacy} \times \frac{60}{144} \times \frac{1 - L_{short}}{1 - 8.3\%}$ <br><br> Second time slot: $TBS_{short} = TBS_{legacy} \times \frac{84}{144} \times \frac{1 - L_{short}}{1 - 8.3\%}$ |
| 2 OFDM symbol | $TBS_{short} = TBS_{legacy} \times \frac{24}{144} \times \frac{1 - L_{short}}{1 - 8.3\%}$ |

TABLE 2-continued

| TTI Duration | TBS of short TTI PDSCH ($TBS_{short}$) |
|---|---|
| 1 OFDM symbol | $TBS_{short} = TBS_{legacy} \times \frac{12}{144} \times \frac{1 - L_{short}}{1 - 8.3\%}$ |

Although studies on the physical layer for such a short TTI are in process, a detailed frame structure for short TTI has not been established yet, and thus there is no specific short TTI operating plan.

The present disclosure proposes a method of configuring a short TTI-based frame structure and a method of delivering information regarding the configuration of the frame structure to a UE according to embodiments.

Unlike a typical LTE/LTE-Advanced frame structure (TTI1=1 ms=14 OFDM symbols), a short TTI may be configured as a set of one symbol, two symbols, three symbols, four symbols, and seven symbols. At this time, a plan of configuring a short-TTI frame structure will be described in consideration of the existing PDCCH, PDSCH, etc.

Plan 1: Configuration is Performed as a Fixed Format Regardless of a PDCCH Region.

Basically, up to three symbols are allocated to legacy PDCCH in full DL band. To this end, the UE may find a symbol period to which PDCCH is allocated by detecting PCFICH first.

Accordingly, it can be seen that the symbol period of PDCCH is always dynamic and thus cannot be fixed to a specific valve.

Since the frame structure of short TTI is obtained by performing additional configuration on a typical TTI frame structure, it is preferable that the dynamic symbol period of PDCCH be always considered upon the configuration. However, the short TTI configuration requires a frequent frame change, and thus frequent signaling and an instruction for a corresponding UE operation are necessary.

Accordingly, the present disclosure proposes a method of using a fixed format regardless of a typical PDCCH period when short TTI is configured by overlaying a typical frame structure.

Plan 1-1: Short TTI May be Dramatically Configured Starting from $1^{st}$ Ofdm Symbol.

Figure 3:
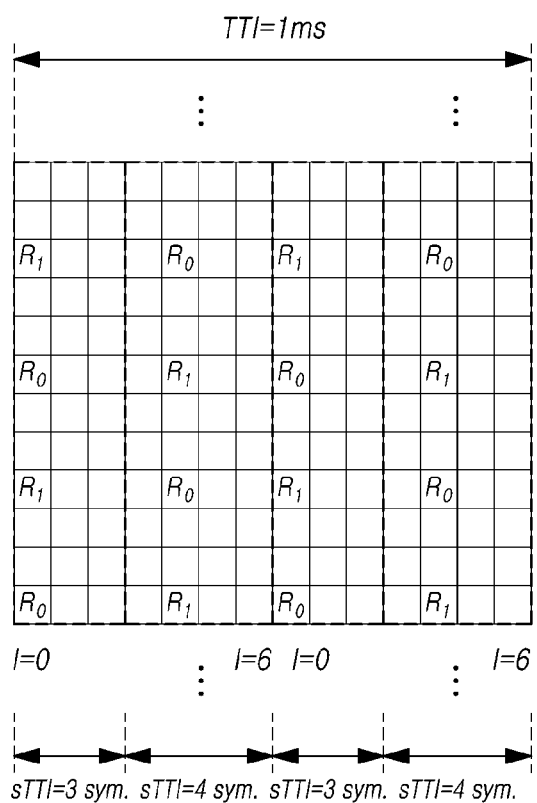
FIG. 3 is a diagram for describing an example (starting from a $1^{st}$ symbol) of an sTTI-based frame configuration according to <Plan 1-1>.

FIG. 3 is a diagram for describing an example (starting from a $1^{st}$ symbol) of an sTTI-based frame configuration according to <Plan 1-1>.

In this proposal, the sTTI-based frame structure is configured without considering a legacy PDCCH region.

That is, regardless of the configuration of PDCCH, the sTTI-based frame structure is configured according to a predefined pattern. In some cases, the structure may overlap a typical PDCCH region, but the frame structure configuration is not changed.

Plan 1-2: Short TTI May be Configured Starting from a Region Excluding a Minimum Number N of Symbols in the Legacy PDCCH.

Figure 4:
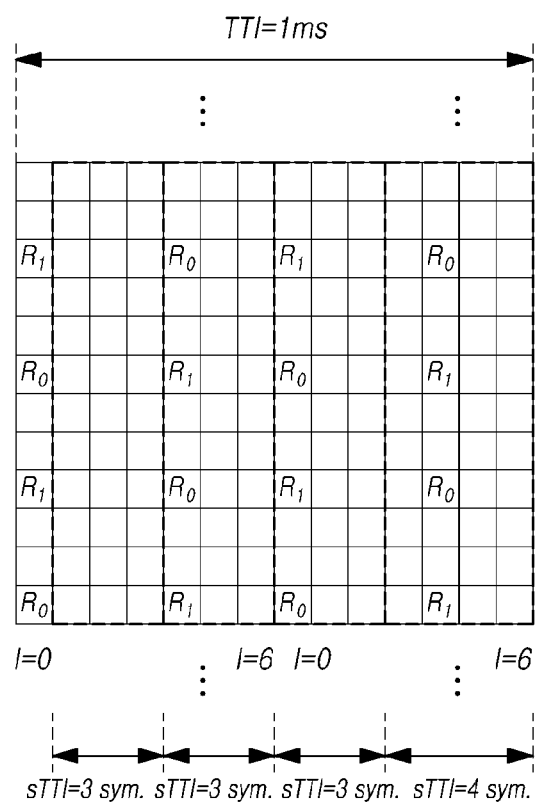
FIG. 4 is a diagram for describing an example (starting from an $n^{th}$ symbol, e.g., a 2nd symbol) of an sTTI-based frame configuration according to <Plan 1-2>.

FIG. 4 is a diagram for describing an example (starting from an $n^{th}$ symbol, e.g., 2nd symbol) of an sTTI-based frame configuration according to <Plan 1-2>.

In the present proposal, an sTTI configuration pattern is determined in consideration of a minimum number N of symbols in the legacy PDCCH region when the sTTI-based frame structure is configured. Here, the following cases may occur.

Case 1: An actual legacy PDCCH region is smaller than N symbols

Case 2: An actual legacy PDCCH region is equal to than N symbols

Case 3: An actual legacy PDCCH region is larger than N symbols

In this proposal, the sTTI-based frame pattern is configured, and used, on the basis of predefined N symbols regardless of configuration situations.

Plan 1-3: When the Fixed Short TTI Format Overlaps with the PDCCH Region, a Short TTI of a Corresponding Area is not Scheduled.

Figure 5:
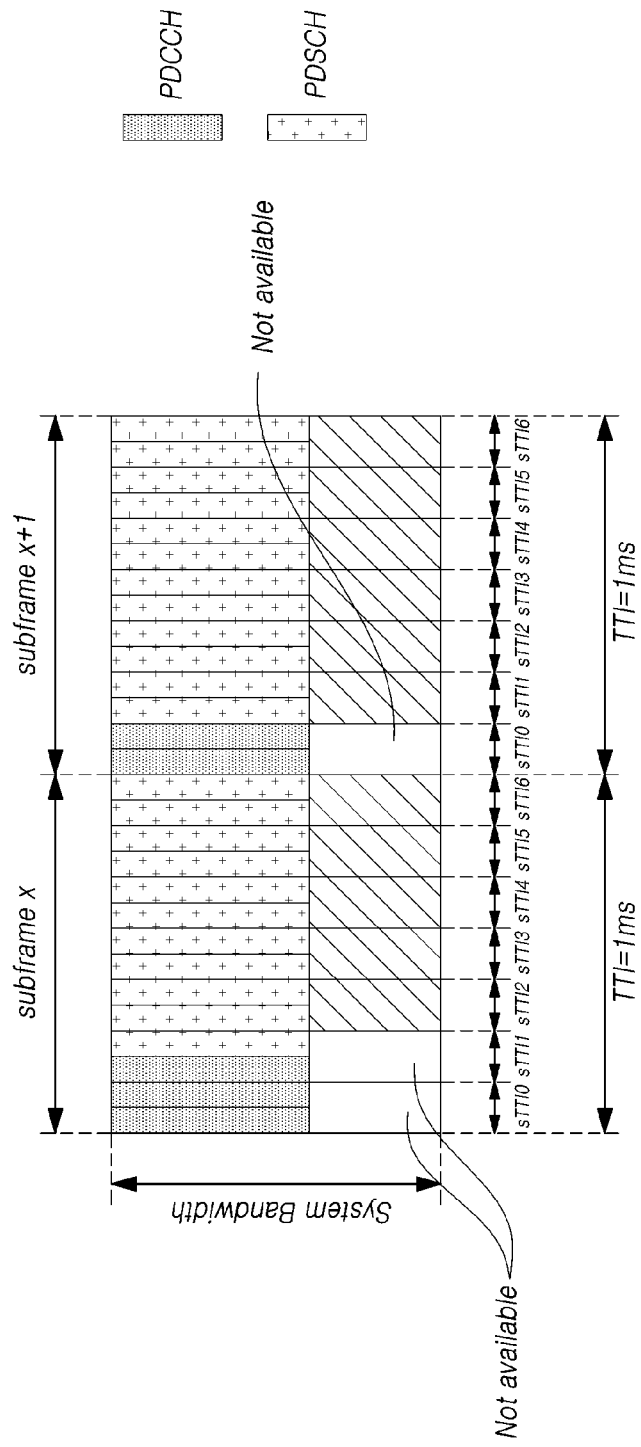
FIG. 5 is a conceptual view showing sTTI scheduling according to <Plan 1-3>.

FIG. 5 is a conceptual view showing sTTI scheduling according to <Plan 1-3>.

Like Plan 1-1 and Plan 1-2 described above, it is assumed that basically, a starting point of the sTTI-based frame structure is configured regardless of the legacy PDCCH region, and a corresponding sTTI frame is also configured.

In this case, as shown in FIG. 5, a collision may occur between the legacy PDCCH region and the sTTI region. In the present proposal, such a collision is prevented by omitting an sTTI scheduling of a corresponding region.

That is, since the legacy PDCCH performs dynamic scheduling basically, the region may be changed in units of subframe. FIG. 3 shows that the legacy PDCCH region is changed from "3-symbol period" to "2-symbol period" in consecutive subframes.

According to this proposal, as short TTI overlaying a corresponding region, two short TTIs in subframe x and one short TTI in subframe x+1 are excluded from being scheduled.

Plan 3: Configuration Information (Such as a Starting Position, a Frame Structure Pattern, Etc.) of Short TTI is Delivered Through a Common Control Region (a Common Search Space) of PDCCH in a Dynamic Singling Scheme.

Figure 6:
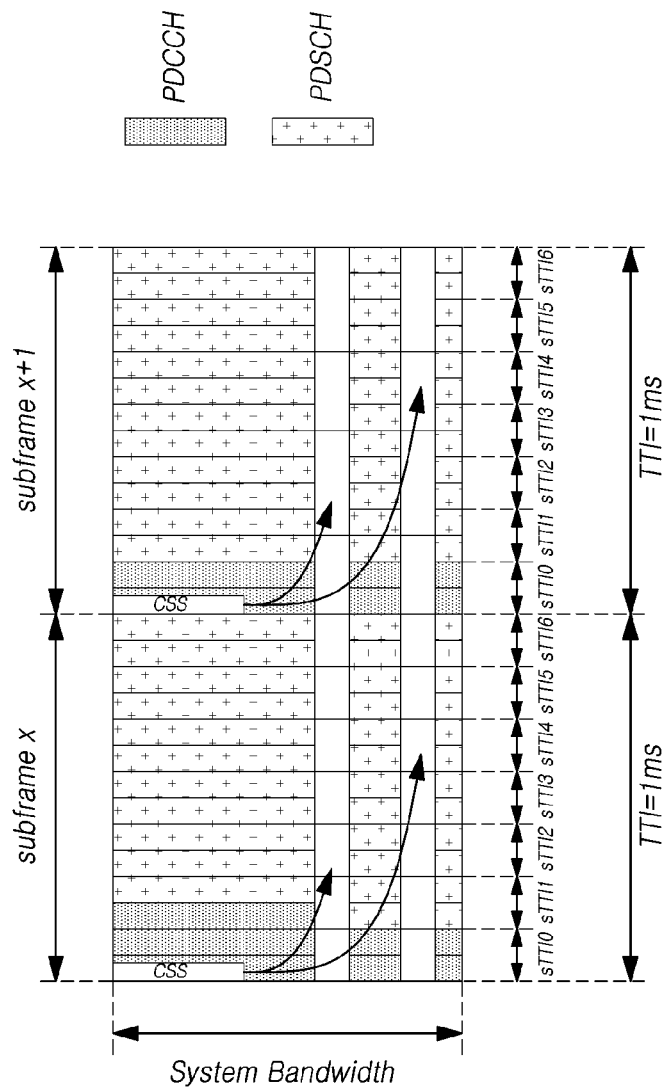
FIG. 6 is a diagram for describing a method of delivering sTTI configuration information according to <Plan 2>.

FIG. 6 is a diagram for describing a method of delivering sTTI configuration information according to <Plan 2>.

This proposal includes a method of delivering the above-described sTTI frame configuration information to UEs and a case of delivering sTTI configuration information through common signaling.

That is, while the entire sTTI configuration information, other than individual resource allocation and control information for each UE, is delivered, the UE may acquire its own available sTTI frame structure by detecting common search space (CSS) of the legacy PDCCH located at the front of the subframe. In this case, it is not possible to deliver sTTI frequency resource region information that the UE can read individually.

The sTTI configuration information may contain the following details.

1) sTTI configuration pattern: short TTIs may be composed of a sequence of one, two, three, four, and seven symbols, and specific information, or pattern information, regarding how short TTIs are combined in the subframe may be delivered.

For example, Pattern 1: two, three, two, two, three, and two symbols (a total of 14 symbols)

Pattern 2: three, four, three, and four symbols (a total of 14 symbols)

2) sTTI frequency region allocation pattern: it is assumed that an sTTI subframe is not entirely, but partially, configured for system BW. Accordingly, specific RBsets may be configured to be continuous, be at regular intervals, or be concentrated in a specific region.

Plan 3: Short TTI Configuration Information is Delivered Through RRC Signaling, and Service Triggering Through Short TTI Frame is Configured by Dynamic Signaling.

Figure 7:
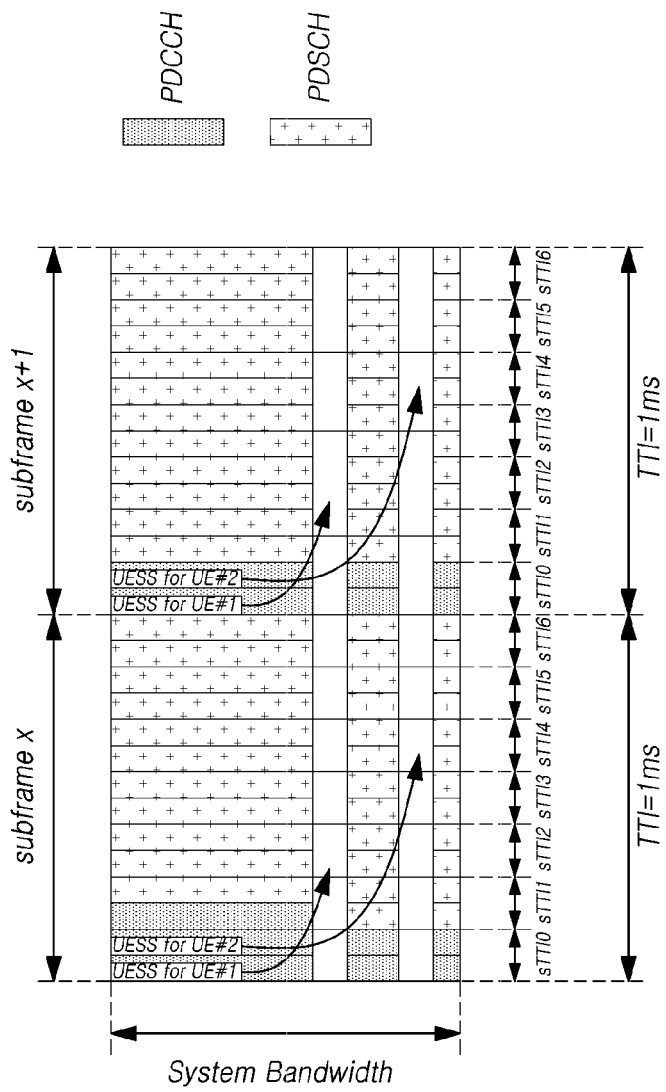
FIG. 7 is a diagram for describing a method of delivering sTTI configuration information according to <Plan 3>.

FIG. 7 is a diagram for describing a method of delivering sTTI configuration information according to <Plan 3>.

This proposal includes a method of delivering the above-described sTTI frame configuration information to UEs and a case of transmitting sTTI configuration information through UE-specific signaling.

That is, when the entire sTTI configuration information, other than specific control information, is delivered, the sTTI configuration information is delivered to individual UEs through RRC signaling.

The sTTI configuration information may contain the following details.

1) sTTI configuration pattern: short TTIs may be composed of a sequence of one, two, three, four, and seven symbols, and specific information, or pattern information, regarding how short TTIs are combined in the subframe may be delivered.

For example, Pattern 1: two, three, two, two, three, and two symbols (a total of 14 symbols)

Pattern 2: three, four, three, and four symbols (a total of 14 symbols)

2) sTTI frequency region allocation pattern: it is assumed that an sTTI subframe is not entirely, but partially, configured for system BW. Accordingly, specific RBsets may be configured to be continuous, be at regular intervals, or be concentrated in a specific region.

3) UE-specific allocation information for sTTI frequency region resources

Each UE may acquire its own available sTTI frame structure by detecting UE-specific search space (UESS) of the legacy PDCCH located at the front of the subframe.

FIG. 7 shows that signaling is performed through UESS when subframes have a common sTTI structure. In this case, the same UE-specific information may be delivered to UEs, and also sTTI frequency resource region readable by each of the UEs may be additionally designated as shown in FIG. 7.

Actual sTTI frame control information may be delivered through sPDCCH.

Figure 8:
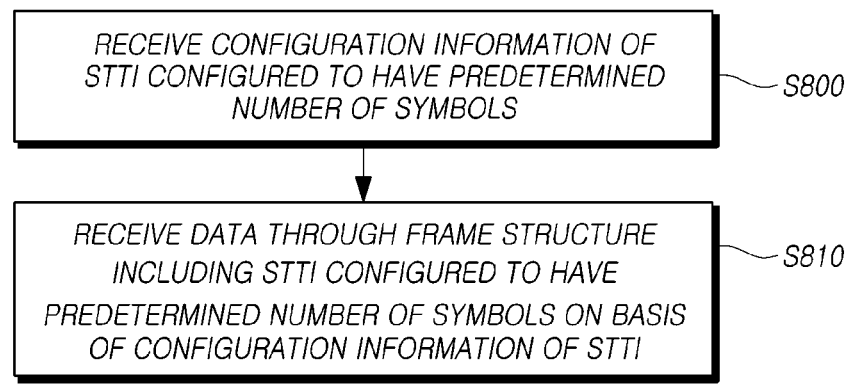
FIG. 8 is a flowchart illustrating a method of a UE for receiving sTTI configuration information according to embodiments.

FIG. 8 is a flowchart for describing a method of a UE for receiving sTTI frame structure configuration information according to embodiments.

Referring to FIG. 8, the UE according to the embodiments receives configuration information of a short TTI configured to have a predetermined number of symbols from a BS (S800).

The UE may receive, from the BS, configuration information of a short TTI configured in a fixed format regardless of a typical PDCCH period.

For example, the short TTI may be configured starting from a $1^{st}$ OFDM symbol. Alternatively, the short TTI may be configured starting from a region excluding a minimum number of N symbols in the legacy PDCCH.

In this case, Plan 1-3: When the fixed short TTI format overlaps with the PDCCH region, a short TTI of a corresponding area is not scheduled. That is, a collision may occur between the legacy PDCCH region and the short TTI region because the short TTI is configured regardless of the typical PDCCH period. According to the embodiments, by omitting an sTTI scheduling in such a situation, it is possible to prevent occurrence of such a collision.

The UE may receive the short TTI configuration information through a common control region of PDCCH by dynamic signaling. The short TTI configuration information may include information on a short TTI configuration pattern, a short TTI frequency region allocation pattern, and the like.

Alternatively, the UE may receive the short TTI configuration information by RRC signaling, and service triggering through a short TT frame may be configured by dynamic signaling. The short TTI configuration information may include a short TTI configuration pattern, a short TTI frequency region allocation pattern, and UE-specific allocation information for short TTI frequency region resources.

Also, the UE may receive the short TTI configuration information through higher layer signaling.

The UE receives data through a frame structure including the short TTI configured to have a predetermined number of symbols on the basis of the short TTI configuration information received from the BS (S810).

Here, the number of symbols of the configured short TTI may be two or seven.

Also, a specific subframe of the short TTI frame structure may have a configuration pattern formed by combining a predetermined number of symbols in the short TTI.

The UE may transmit data through a frame structure including the short TTI configured to have the predetermined number of symbols. In this case, the number of symbols may be two, four, or seven.

Figure 9:
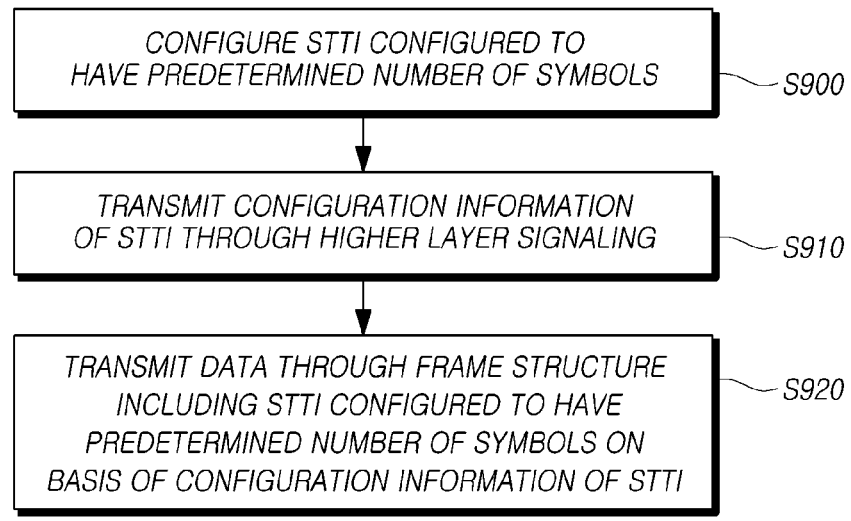
FIG. 9 is a flowchart illustrating a method of a base station for transmitting sTTI configuration information according to embodiments.

FIG. 9 is a flowchart for describing a method of a UE for transmitting sTTI frame structure configuration information according to embodiments.

Referring to FIG. 9, according to embodiments, a BS configures a short TTI to have a predetermined number of symbols (S900).

The BS may configure the short TTI in a fixed format, regardless of a typical PDCCH period.

For example, the BS may configure the short TTI starting from a $1^{st}$ OFDM symbol. Also, the BS may configure the short TTI starting from a region excluding a minimum number of N symbols in the legacy PDCCH.

In this case, a collision may occur between the legacy PDCCH region and the short TTI region because the short TTI is configured regardless of the typical PDCCH period. Accordingly, when the fixed short TTI format overlaps with the PDCCH region, a short TTI of a corresponding area may not be scheduled.

The BS transmits short TTI configuration information to the UE (S910).

The BS may transmit the short TTI configuration information through a common control region of PDCCH by dynamic signaling. The short TTI configuration information may include information such as a short TTI configuration pattern, a short TTI frequency region allocation pattern, and the like.

Alternatively, the BS may transmit the short TTI configuration information by RRC signaling, and service triggering through a short TT frame may be configured by dynamic signaling. The short TTI configuration information may include a short TTI configuration pattern, a short TTI frequency region allocation pattern, and UE-specific allocation information for short TTI frequency region resources.

Also, the BS may transmit the short TTI configuration information through higher layer signaling.

The BS transmits data through a frame structure including the short TTI configured to have a predetermined number of symbols on the basis of the short TTI configuration information (S920).

Here, the number of symbols of the configured short TTI may be two or seven.

Also, a specific subframe of the short TTI frame structure may have a configuration pattern formed by combining a predetermined number of symbols in the short TTI.

The BS may receive data through a frame structure including the short TTI configured to have the predetermined number of symbols. In this case, the number of symbols may be two, four, or seven.

Figure 10:
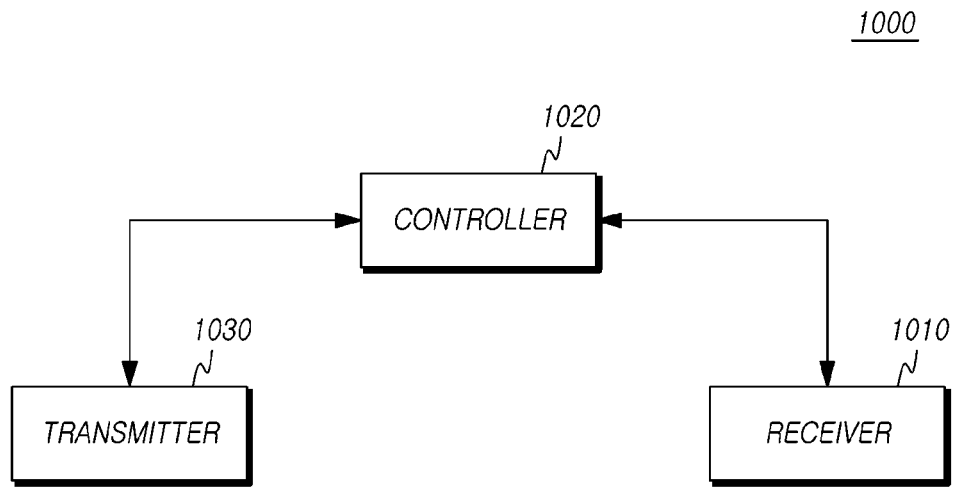
FIG. 10 shows a UE according to embodiments.

FIG. 10 is a diagram showing a UE that receives the sTTI frame structure configuration information according to embodiments.

Referring to FIG. 10, the UE 1000 according to the embodiments includes a receiver 101, a controller 1020, and a transmitter 1030.

The receiver 1010 receives DL control information, data, and messages from a BS through corresponding channels The controller 1020 controls the entire process of the UE 1000 in response to configuration of an sTTI-based frame structure and reception of information regarding the frame structure configuration, which are needed to implement the embodiments described above.

The transmitter 1030 transmits UL control information, data, and messages to the BS through corresponding channels.

Figure 11:
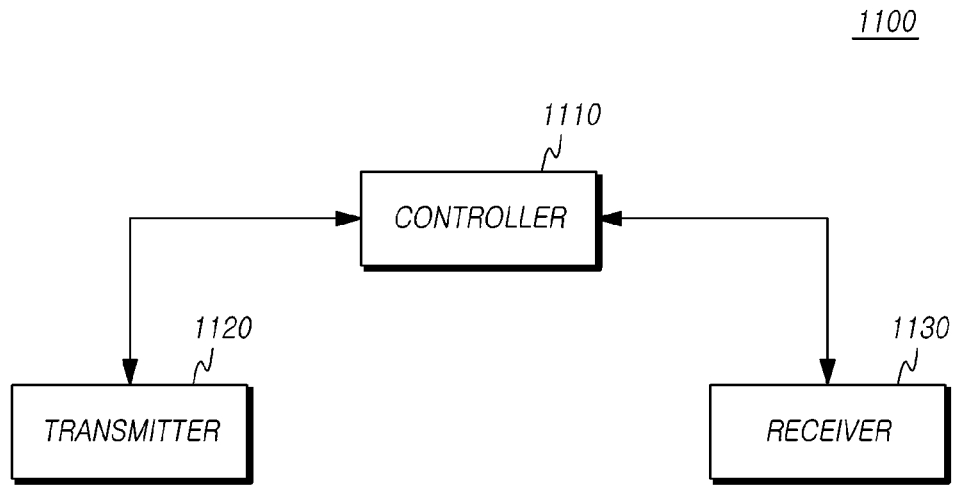
FIG. 11 shows a base station according to embodiments.

FIG. 11 is a diagram showing a BS that transmits the sTTI frame structure configuration information according to the embodiments.

Referring to FIG. 11, the BS 1100 according to the embodiments includes a controller 1110, a transmitter 1120, and a receiver 1130.

The controller 1110 controls the entire process of the BS 1100 in response to configuration of an sTTI-based frame structure and transmission information regarding the frame structure configuration to a UE, which are needed to implement the invention described above.

The transmitter 1120 and the receiver 1130 are used to transmit and receive signals, messages or data needed to implement the invention described above, to and from the UE.

In this disclosure, a method of configuring an sTTI-based frame structure and a specific method of delivering information regarding the configuration have been described, and the principles of the methods may be applied not only to a new frame structure but also to similar signals and channels.

Specifications and standards mentioned in the foregoing embodiments have been omitted herein to simplify the description of the present specification but still constitute part of the present specification. Therefore, it should be understood that parts of the specifications and standards can be added to the present specification or be specified in the claims and still be within the scope of the present invention.

The above-described subject matter of the present disclosure is to be considered illustrative and not restrictive, and it should be understood that numerous other modifications and embodiments can be devised by those skilled in the art that will fall within the spirit and scope of the principles of the present disclosure. Therefore, the embodiments disclosed herein are intended not to limit but to describe the technical spirit of the present disclosure, and the scope of the present disclosure is not limited to the embodiments. The scope of the disclosure should be construed by the appended claims, and all technical sprits within the scope of their equivalents should be construed as included in the scope of the disclosure.

The invention claimed is:

1. A method of a user equipment (UE) for receiving short transmission time interval (TTI) frame structure configuration information, the method comprising:

receiving a radio resource control (RRC) signal including first configuration information of a short TTI and second configuration information of resource blocks (RBs) related to the short TTI; and receiving data within a frame structure that includes short TTIs, based on the first configuration information of the short TTI, wherein the short TTIs are configured based on at least one of a first pattern and a second pattern, wherein the at least one of the first pattern and the second pattern is selected based on a number of symbols used for a physical downlink control channel (PDCCH), and wherein the first pattern includes four sets of two symbols and two sets of three symbols among a total 14 symbols.

2. The method of claim 1, further comprising:
transmitting data within the frame structure including the short TTIs.

3. A method of a base station for transmitting short transmission time interval (TTI) frame structure configuration information, the method comprising:

configuring a short TTI;

transmitting a radio resource control (RRC) signal including first configuration information of the configured short TTI to a user equipment (UE) and second configuration information of resource blocks (RBs) related to the short TTI; and transmitting data within a frame structure including shirt TTIs, wherein the short TTIs are configured based on at least one of a first pattern and a second pattern, wherein the at least one of the first pattern and the second pattern is selected based on a number of symbols used for a physical downlink control channel (PDCCH), and wherein the first pattern includes four sets of two symbols and two sets of three symbols among a total 14 symbols.

4. The method of claim 3, further comprising:
receiving data within the frame structure that includes the short TTIs.

5. A user equipment (UE) for receiving short transmission time interval (TTI) frame structure configuration information, the UE comprising:

a receiver configured to receive a radio resource control (RRC) signal including first configuration information of a short TTI and second configuration information of resource blocks (RBs) related to the short TTI; and a controller configured to control the receiver to receive data within a frame structure including short TTIs, based on the first configuration information of the short TTI, wherein the short TTIs are configured based on at least one of a first pattern and a second pattern, wherein the at least one of the first pattern and the second pattern is selected based on a number of symbols used for a physical downlink control channel (PDCCH), and wherein the first pattern includes four sets of two symbols and two sets of three symbols among a total 14 symbols.

6. The UE of claim 5, further comprising:
a transmitter configured to transmit data within the frame structure that includes the short TTIs.

* * * * *